(12) United States Patent
Malkin (10) Patent No.: US 11,037,170 B2
(45) Date of Patent: Jun. 15, 2021

(54) STORAGE AND RETRIEVAL OF FINANCIAL TRANSACTION COMMUNICATIONS FOR REGULATORY COMPLIANCE

(71) Applicant: Mona Holdings, LLC, Morris Plains, NJ (US)

(72) Inventor: Snezhana Malkin, Morris Plains, NJ (US)

(73) Assignee: MONA HOLDINGS, LLC, White Plains, NJ (US)

( * ) Notice: Subject to any disclaimer, the term of this patent is extended or adjusted under 35 U.S.C. 154(b) by 275 days.

(21) Appl. No.: 16/419,470

(22) Filed: May 22, 2019

(65) Prior Publication Data

US 2020/0372517 A1 Nov. 26, 2020

(51) Int. Cl.
*G06Q 20/10* (2012.01)
*G06Q 30/00* (2012.01)
*G06Q 40/00* (2012.01)
*G06Q 20/38* (2012.01)

(52) U.S. Cl.
CPC .......... *G06Q 30/018* (2013.01); *G06Q 20/10* (2013.01); *G06Q 20/389* (2013.01); *G06Q 40/12* (2013.12)

(58) Field of Classification Search
None
See application file for complete search history.

(56) References Cited

U.S. PATENT DOCUMENTS 10,832,247 B2 * 11/2020 Durvasula .......... G06Q 20/3829

* cited by examiner

*Primary Examiner* — Paul Danneman
(74) *Attorney, Agent, or Firm* — Wayne F. Reinke, Esq.; Heslin Rothenberg Farley & Mesiti P.C.

(57) ABSTRACT

Disclosed is a computer-implemented method (and corresponding system and program product) that includes identifying, by a data processing system associated with a financial institution that is a party to an electronic financial transaction (EFT), an end of the EFT; based on the identifying, collecting, by the data processing system, all communications into and out of the financial institution relating to the EFT required to be accessible during a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

20 Claims, 8 Drawing Sheets

STORAGE AND RETRIEVAL OF FINANCIAL TRANSACTION COMMUNICATIONS FOR REGULATORY COMPLIANCE

BACKGROUND

Financial institutions participating in electronic financial transactions ("EFTs") must comply with numerous rules, regulations, laws, etc. For example, financial institutions are required to securely store, make available and dispose of EFT-based communications on a per transaction basis. Current solutions focus on capturing all internal communications on a given day and then trying to piece a transaction together.

SUMMARY

Shortcomings of the prior art are overcome and additional advantages are provided through the provision, in one aspect, of a computer-implemented method of storage and retrieval of financial transaction communications. The method includes: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

In another aspect, a system may be provided. The system may include, for example, memory(ies), at least one processor in communication with the memory(ies). The memory(ies) include program instructions executable by the one or more processor to perform a method. The method may include, for example: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

In a further aspect, a computer program product may be provided. The computer program product may include a storage medium readable by a processor and storing instructions executable by the processor for storage and retrieval of financial transaction communications. The method may include, for example: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

Services relating to one or more aspects of this disclosure are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Financial institutions are required to retain records related to the business they transact to maintain compliance with Records Management laws and regulations. The records must be stored, made accessible and disposed of in a compliant manner.

"Compliant manner" herein includes, but is not limited to: the records must be kept unaltered, i.e., protected from modifications, tampering and/or deletion; the records must be kept reliably and contain complete and accurate information; the records must be produced promptly upon request; and the records must be completely disposed of after retention period has expired. As the laws and regulations change, what is compliant will of course need to adapt as well.

Records produced by transactional systems (i.e., trading and payment systems) are different from other data that the financial companies may keep for regulatory purposes. For example, transactional data is structured, i.e., has a predefined data model and transactional data has a high level of granularity, i.e., individual messages or fields versus files or documents.

The data model of transactional data is unique to the financial institution and the computer systems within the institution that are used to process this data. The messages exchanged by computer systems within a financial institution and data representation stored in databases often have proprietary formats.

In a financial company, most of the transactional records, such as trading and payments, are created and processed by multiple computer systems. Each system receives data from multiple other systems, then processes it, then stores the data, and then passes it to another system. To prove accuracy and completeness of the data collected for records management purposes, financial institutions are building costly and complex data lineage systems to trace movement of data within the institution.

Collecting and retaining transactional data for regulatory purposes presents a significant challenge due to the complexity of gathering data from multiple computer systems within a financial institution and converting the data to a standard format for storage, interpretation, and validation to ensure accuracy and completeness of collected data.

If a financial institution retains data in their proprietary format then they also need to maintain the applications that can read, search and interpret this data years after it was produced and which may no longer be supported by the vendor. Additionally, they need to ensure completeness of the data stored or they will not be able to recreate the life cycle of transactions with sufficient details to answer regulatory inquiries. Some transactions can be open for hours, days, months or even years. To answer questions about such transactions, financial institutions need to search data stored in different formats across multiple systems that cover a broad timeframe.

Within a large financial institution, the applications are frequently upgraded or replaced, and new systems are added as the old ones are decommissioned. The internal data exchange formats are not standardized, and the data flow is changing frequently. Potentially, hundreds of systems may be involved in a given transactional business. This makes capturing and retaining data in a compliant manner complex, costly and sometimes not possible. And yet, failure to execute it on a daily basis leads to stiff fines if the data cannot be properly presented to regulators or auditors upon request.

The process of data collection, re-structuring and preparation for data retention can introduce errors and/or modifications that may put data authenticity, completeness and accuracy at risk. Tracking of data custody also presents a significant problem in the environment where the data must go through complex collection and re-structuring processes.

Consequently, even if financial institutions managed to retain the data, they may still be at risk of non-compliance (and therefore exposed to fines) for inability to provide a specific data subset that matches the parameters of regulatory inquiry, or provide a proof of data authenticity, quality, completeness and immutability.

Regulators define triggers that start the retention period for transactional data. These triggers are represented on a transactional level and are typically defined as the end of a transaction, i.e., at trade completion and settlement. However, financial institutions typically retain transactional data in daily files and set retention on the file level. Such files contain all messages sent and received by a financial institution during a certain trading day, so messages associated with a specific transaction may be recorded in several daily files over multiple days or even years. As these files are retained for regulatory purposes, the financial institutions cannot delete them until the retention period of all transactions in each file has expired, resulting in some records being retained much longer than required. This can also cause non-compliance due to considerable over-retention of data.

As used herein, the term "electronic financial transaction" or "EFT" refers to a transaction (e.g., buying, selling, settlement and clearing) involving a financial product, which can include, for example, equities, fixed income, foreign exchange, derivatives, etc. Communications into and out of a financial institution are collected on a per-transaction basis.

As used herein, the term "immutable" when used with respect to communications regarding an EFT, means the collected EFT communications are maintained unchangeable for a retention period required by rule, regulation or statute.

As used herein, the term "collecting" used with respect to communications related to an EFT, refers to identifying and storing such communications on a per-transaction basis.

As used herein, the term "error detection value" refers to a value used in error detection, which includes, for example, a checksum, a hash, etc.

Figure 1:
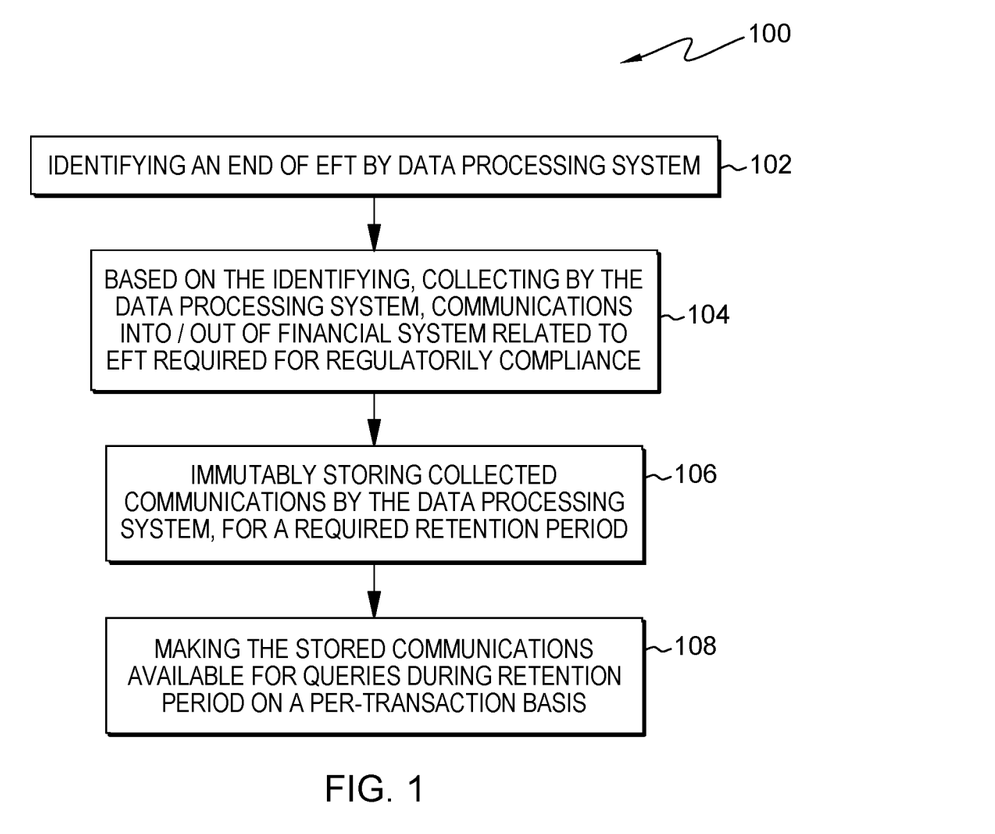
FIG. 1 is a flow diagram for one example of a computer-implemented method, in accordance with one or more aspects of the present disclosure.

FIG. 1 is a flow diagram 100 for one example of a computer-implemented method of storing EFT-based communications, in accordance with one or more aspects of the present disclosure. The method includes, for example, identifying 102, by a data processing system, an end of an Electronic Financial Transaction (EFT) of a financial institution. The method also includes, based on identifying the end of the EFT, collecting 104, by the data processing system, communications into and out of the financial institution related to the EFT required by regulators to be accessible for a retention period. Thus, the identification of the end of an EFT and collecting the financial transaction communications together constitute "preprocessing" of the communications, which, in one embodiment, is based on the protocol used, as described more fully below. The method may further include, for example, immutably storing 106, by the data processing system, the collected communications for the retention period. The method may further include, for example, making 108, by the data processing system, the stored communications available for queries during the retention period on a per-transaction basis.

Figure 2:
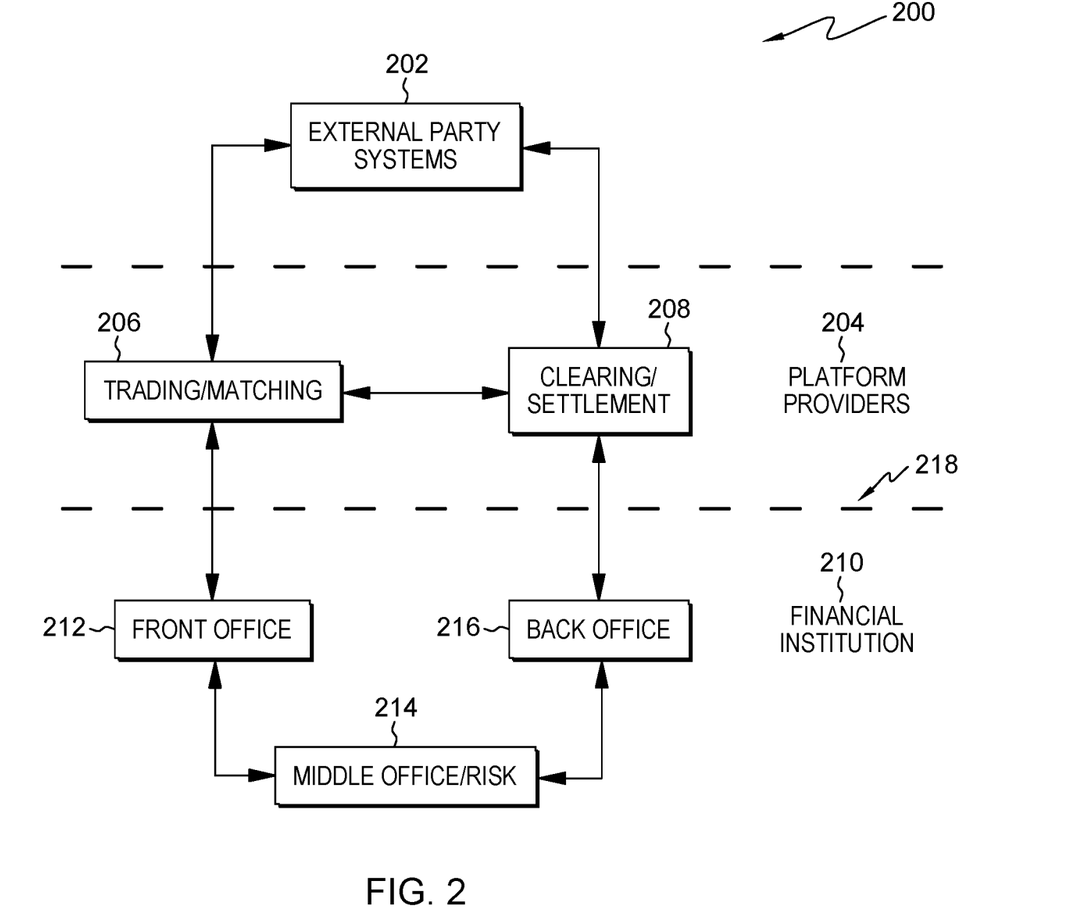
FIG. 2 is a combination block/flow diagram of one example of a flow of transactional data in a trading or investment business, in accordance with one or more aspects of the present disclosure.

FIG. 2 is a combination block/flow diagram 200 of one example of a flow of transactional data in a trading or investment business, in accordance with one or more aspects of the present disclosure. External party system(s) 202 communicate with platform provider(s) 204, which may include, for example, trading/matching 206 and clearing/settlement 208. In turn, the platform provider(s) communicate with a financial institution 210, which may include, for example, a front office 212, a middle office/risk 214 and a back office 216. Communications across a boundary 218 between the platform provider(s) and the financial institution, i.e., those into and out of the financial institution, that are related to a given electronic financial transaction are captured as required by, for example, a government regulatory body according to applicable statute(s), regulation(s), rule(s), etc.

Instead of capturing transactional data for retention and archiving purposes from each system within a financial institution inside its departments and functions, such as Front, Middle, Risk and Back Office, the transactional data, in accordance with one or more aspects of the present disclosure, can be captured as it leaves and enters this particular financial institution. The lifecycle of the transactions can then be recreated later based on protocol specification and without using proprietary application(s).

Regulators and auditors can validate the authenticity of data provided by a financial institution, in accordance with the present disclosure, by requesting similar data from counterparties and platform providers. The use of standard protocols allows comparing, cross-checking and validating the data that originates from different sources.

Interpretation of data and recreation of transaction lifecycles is simplified by using tools that interpret a specific protocol and its version that was used when the data was recorded. Such tools are limited in complexity and can be ported to and/or integrated with other applications.

Figure 3:
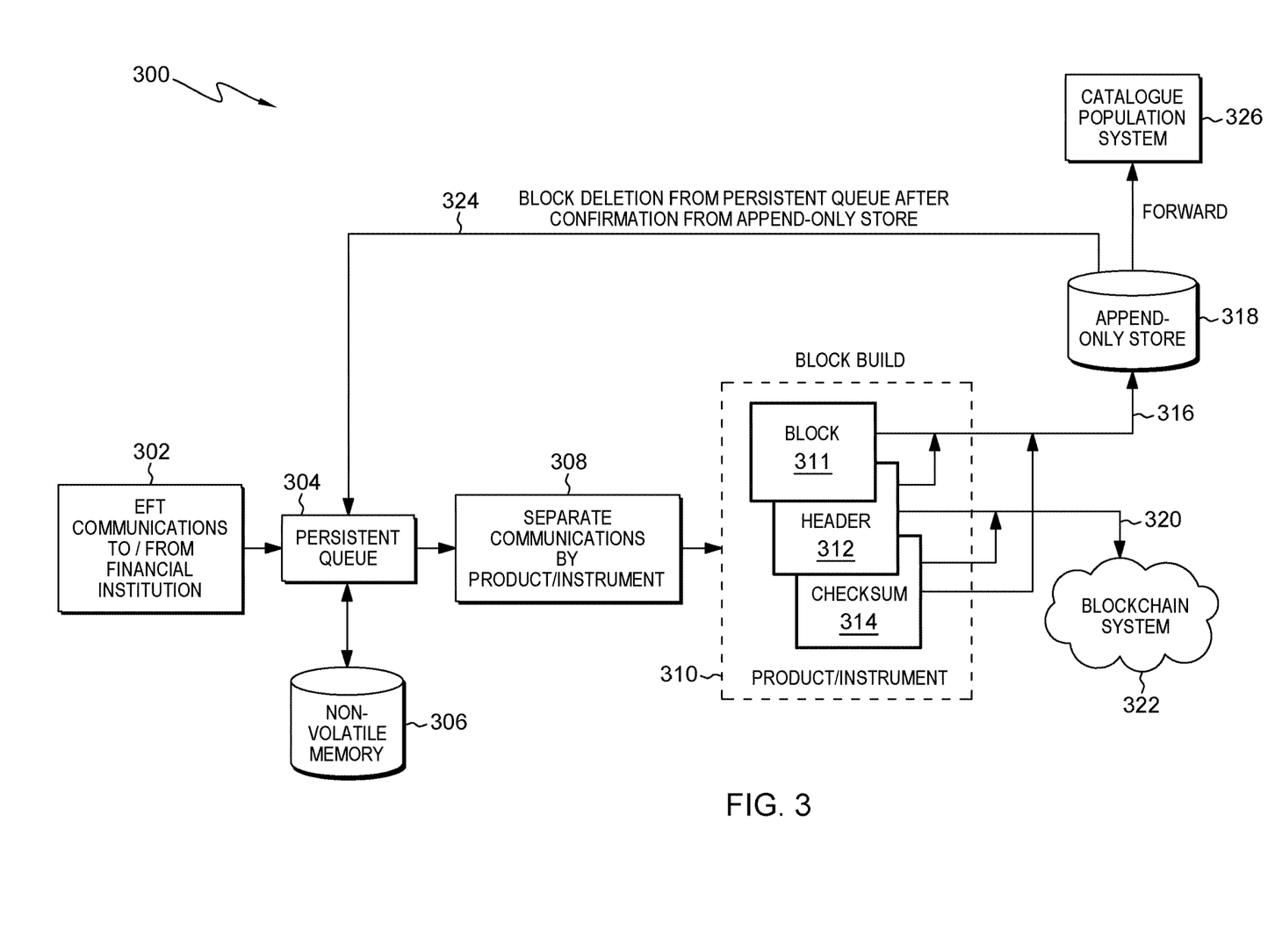
FIG. 3 is a combination block/flow diagram for one example of a system for retaining EFT-based communications into/out of a financial institution, in accordance with one or more aspects of the present disclosure.

FIG. 3 is a combination block/flow diagram for one example of a system 300 for retaining mandated EFT-based communications 302 into/out-of a financial institution, and only such communications, in accordance with one or more aspects of the present disclosure. In embodiment(s), the communications are stored in, for example, a persistent queue 304, which retains the communications in non-volatile memory 306 (e.g., in case of data loss or bottle neck in path) until no longer needed, as described further below. In embodiment(s), the communications may be forwarded for separation 308 according to, for example, financial product/instrument. Data block 310 may then be built according to the separated communications. This may include, for example, creation of a header 312 and an error-detection value (e.g., checksum) 314. The data block (includes EFT-based communications), header and checksum, 311, 312 and 314, respectively, may thereafter be sent 316 to append-only storage 318. Data from the persistent queue may be deleted 324 when it is confirmed by append only storage that this data was successfully stored there. Concurrently, the header and checksum, 312 and 314, are forwarded 320 to a blockchain system 322, subsequently explained in more detail. After the block/header/checksum is written to the append-only storage, it may be forwarded to, for example, a catalogue population system 326 that populates a catalog for the data, the operation of which is explained with respect to FIG. 7.

In one embodiment, when messages are picked up from the persistent queue, they may be separated by product/instrument, for example, before blocks are created. This allows for more efficient block management during retention because the same product/instrument typically have the same retention period.

Once a header is added to a block, in one embodiment, an error detection value (e.g., checksum or hash) may be calculated for all data in the block. The inclusion of an error detection value provides protection from data manipulation and facilitates detection of data corruption.

In one embodiment, the data block (including header and checksum) may be stored in an append-only database, for example, in the "cloud" or otherwise in remote (or local) storage. In one embodiment, the data can be encrypted to protect proprietary information. To create redundancy in case of primary storage loss or corruption, the data can be written to multiple distributed storage systems.

Concurrently, in one embodiment, the header and the checksum may be sent as a transaction to a blockchain platform (or system) to create an unmodifiable record of block creation at a specific date/time and provide authenticity of the content. The creation of this blockchain transaction will start the chain of data custody for each block. In one embodiment, the blockchain system may create its own error detection value, increasing protection of the data.

This method of data preparation enables open monitoring of the chain of custody, ensures data authenticity and simplifies detection of data alterations.

The data blocks, in practice, will frequently include portions of multiple transactions for the same or similar product types. In one embodiment, enabling retention and deletion on a per-transaction basis may be accomplished via creation of a catalogue. A catalogue will serve two main purposes. One main purpose is to provide prompt access to information about data retained by a specific financial institution for regulators and third parties, which is a regulatory requirement in the United States. The catalogue will also support assignment of retention periods on a per-transaction basis. After a data block is written to the append-only store, it will be forwarded to a system that populates the catalogue. The system will record the block ID, assigned when the block is created, and information from the block header.

The system will then read the content of the block in order to: record all unique transaction IDs within this block and relationships between IDs within a single transaction; identify all messages that represent the start and the end of a transaction; and assign a retention period to each message in a given transaction.

Figure 4:
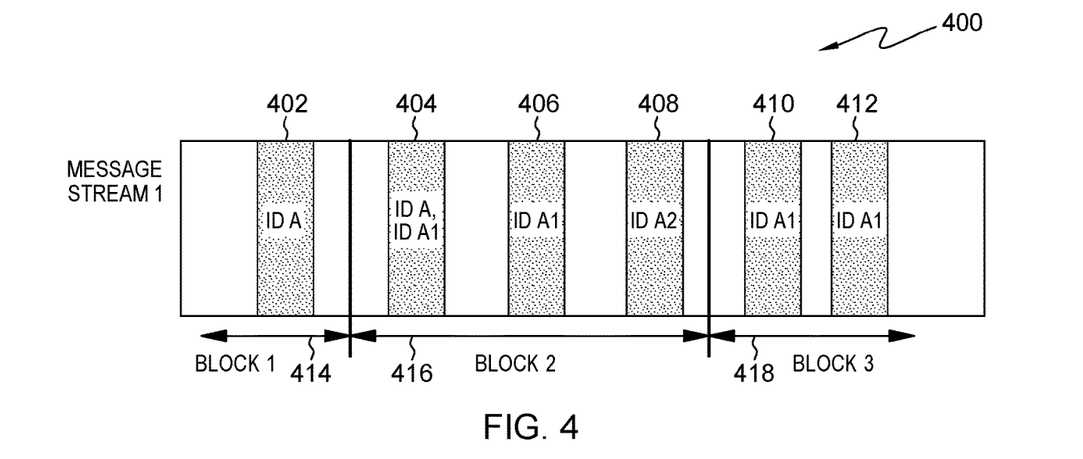
FIG. 4 is a block diagram of one example of multiple messages (or communications) grouped into data blocks, in accordance with one or more aspects of the present disclosure.

FIG. 4 is a block diagram 400 of one example of multiple messages (or communications) (402, 404, 406, 408, 410 and 412) related to a transaction, the messages grouped into data blocks 414, 416 and 418, in accordance with one or more aspects of the present disclosure. A given data block may include multiple messages related to more than one transaction (EFT).

Figure 5:
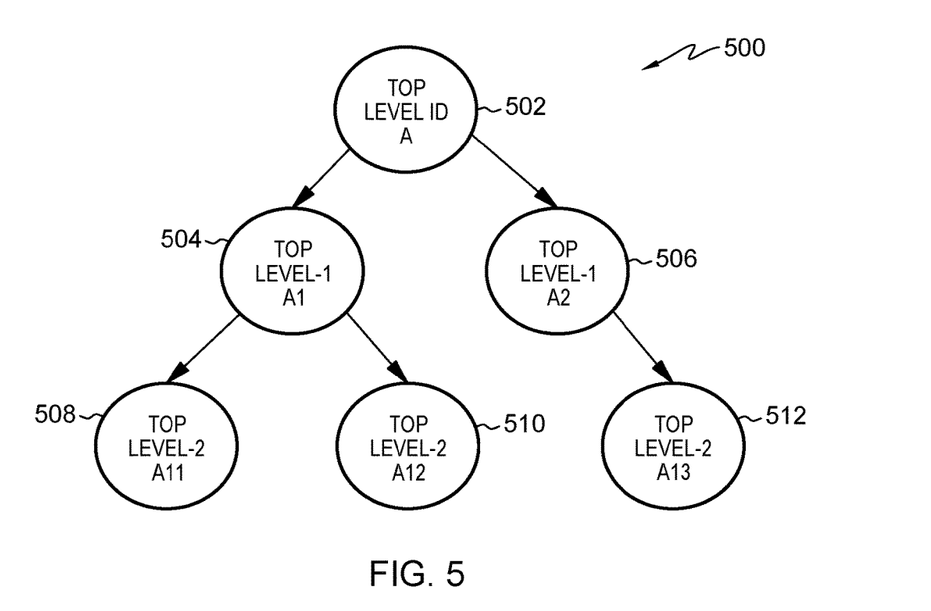
FIG. 5 depicts a hierarchy of transaction (i.e., EFT) IDs, in accordance with one or more aspects of the present disclosure.

FIG. 5 depicts a hierarchy 500 of transaction (i.e., EFT) IDs (502, 504, 506, 508, 510 and 512), all associated with the same transaction, in accordance with one or more aspects of the present disclosure. Relationships between the transaction IDs are also conveyed in FIG. 5. For example, transaction ID 502 is related to both transaction ID 504 and 506, while transaction ID 506 is related to transaction ID 512.

To identify all messages belonging to a single transaction, a hierarchy of transaction IDs and their relationships will be recreated in the catalogue. For each product/instrument a message type, which represents transaction start and transaction end, will be defined and all messages that make up a transaction will be identified. The catalogue will record the assigned retention period for each message associated with a transaction within the block. Note that some messages in blocks may not be part of a specific transaction and therefore may not have retention assigned. The messages will be deleted when the block is deleted. Once all retention periods within a block are recorded, the blocks can be deleted when the longest retention period for transactions within a given block expires.

As part of executing transactions on behalf of customers or for their own business purposes, the financial institutions are communicating with their peers, platform providers (system, service and infrastructure), government agencies and other organizations.

There is a finite number of transactional business performed by a financial institution. Transactional business refers to servicing a specific type of financial product, for example, equities, fixed income, foreign exchange, derivatives, etc.

Each financial institution has a finite number of platform providers it uses to communicate with peers and counterparties to execute the transactions. In one example, transactions may start with a request for quote or order (bid/offer) submission and end with confirmation of completed trade and settlement. Platform providers create a unique transaction ID and use it for messages associated with each transaction. In accordance with one or more aspects of the present disclosure, a lifecycle of each trade can be recreated by collecting all messages associated with a specific transaction ID or related transaction IDs.

For the purposes of transaction execution, customers are represented by customer ID or account ID. Trading partners or legal entities are represented by trading floor name/ID or counterparty name/ID.

The transactions can last from a few seconds to several years, depending on the financial product traded. For example, equities or foreign exchange transactions can be executed from start to end in less than a few seconds. On the other hand, derivatives such as futures contracts can be in execution state for years.

The communications between counterparties at any given time conform to a finite number of industry standard protocols established by financial institutions that do not frequently change. These protocols are designed to include information necessary to recreate the lifecycle of individual transactions.

Current Examples of Major Protocols Used in Financial Services are listed in Table I below.

TABLE I

| Data exchange purpose | Protocol |
| --- | --- |
| Pre-trade, Trade | FIX, FpML, ISO(20022, 15022 and MT messages) |
| Post trade, Clearing, Pre-settlement | FIX, FpML, ISO(20022, 15022 and MT messages) |
| Asset servicing | FpML, ISO(20022, 15022 and MT messages), XBRL |
| Collateral Management | FIX, FpML, ISO(20022, 15022 and MT messages) |
| Settlement | ISO(20022, 15022 and MT messages) |
| Pricing/Risk/Reporting | FpML, ISO(20022, 15022 and MT messages) |
| Payments | SWIFT, SWIFT GPI |

Figure 6A:
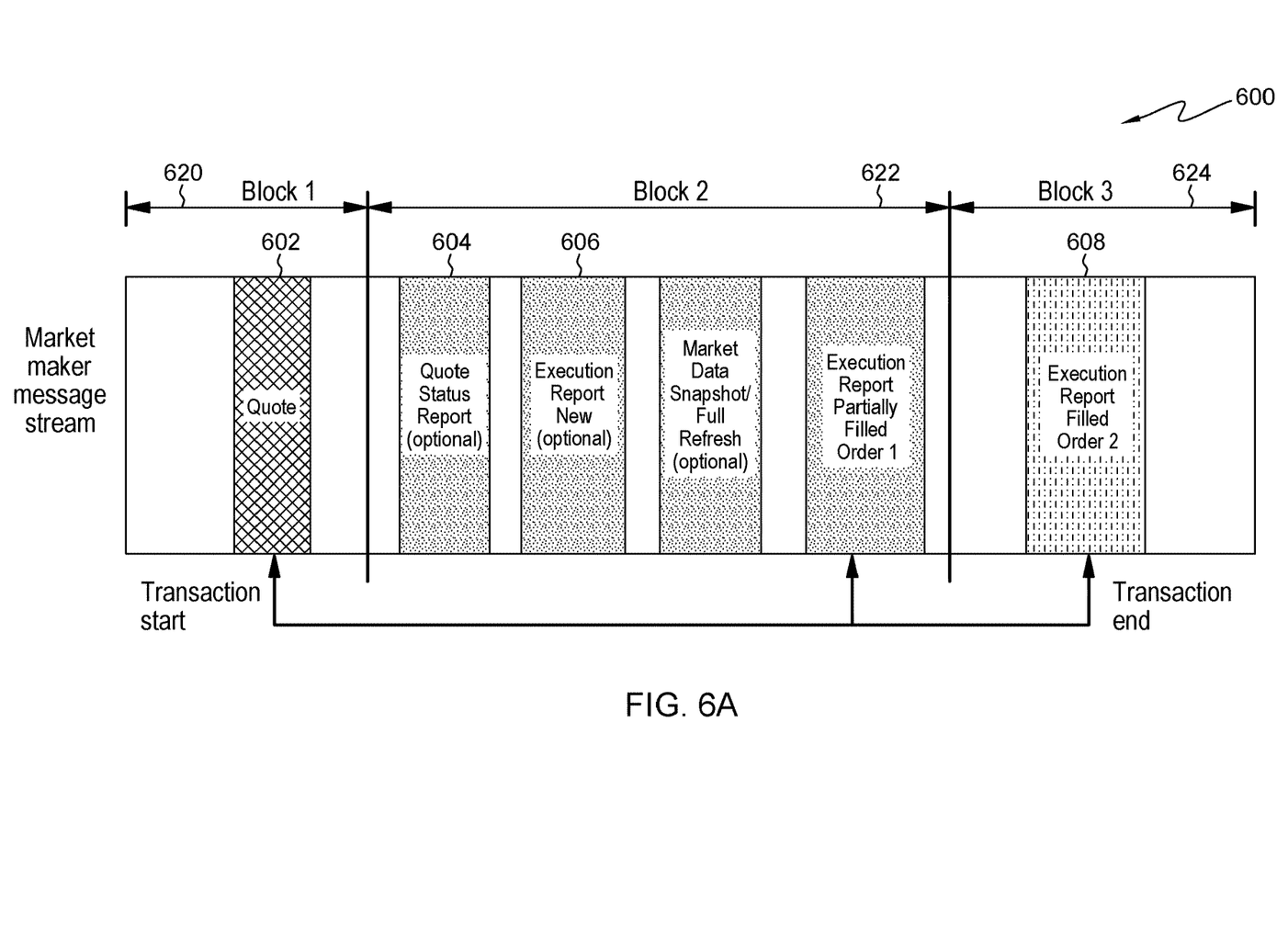
FIG. 6A is a flow diagram of a sell-side message stream for a transaction, in accordance with one or more aspects of the present disclosure.

FIG. 6A is a flow diagram of a sell-side message stream 600 for a transaction. The transaction spans data blocks 620, 622 and 624.

This example illustrates pre-processing for a Foreign Exchange (FX) transaction for a tradable quoting market using the Financial Information eXchange ("FIX") 4.4 protocol, which may change over time. Some optional messages may be omitted in this example.

Financial institutions define message types they want to use as start/end of transactions. This definition depends on the role that given institution plays in the market.

In the example below, FIX 4.4 message names, such as Quote, Execution Report, etc. are used. The shorthand specified in angle brackets represents message type set in MsgType field in FIX message header. A similar notation is used for FIX 4.4 message fields where QuoteID, OrdStatus, etc. are field names with the field tag specified in angle brackets.

For market makers (sell-side institutions), the following definitions can be use used:
 1. Start of transaction—Quote<S> message.
 2. End of transaction—Execution Report<8> message with order fill confirmation or Quote Status Report<AI> message with quote cancelation acknowledgement whichever arrives first.

Figure 7:
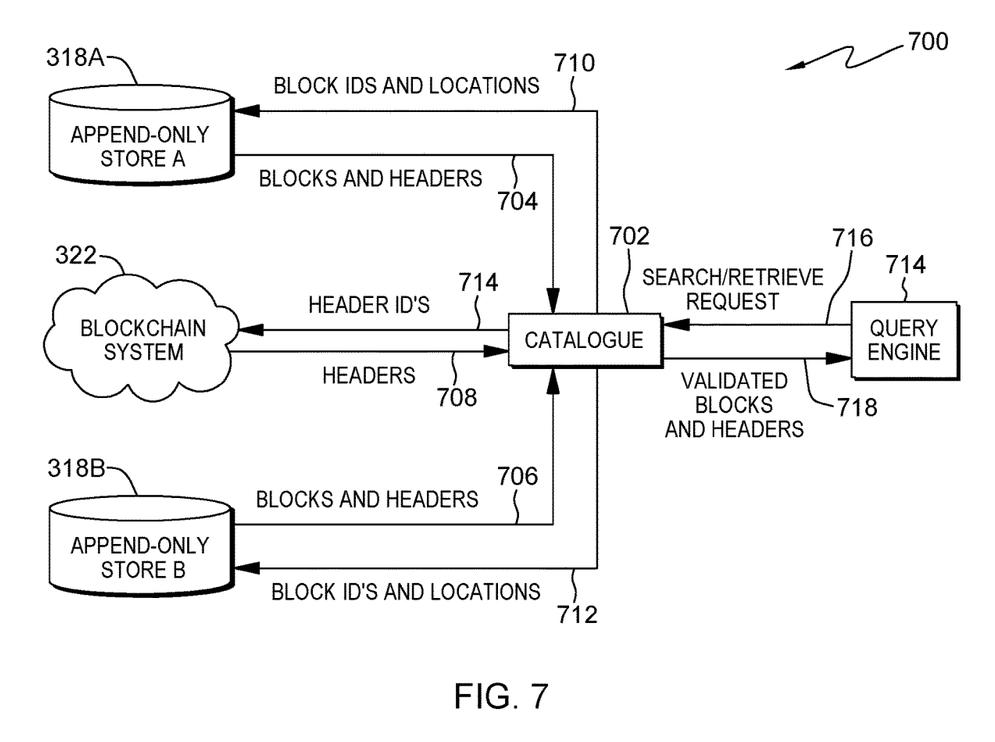
FIG. 7 is a combination block/flow diagram of one example of operation of a data block catalogue, in accordance with one or more aspects of the present disclosure.

A Quote<S> message 602 initiated by a market maker with a new QuoteID<117> field identifies the start of transaction and will trigger creation of a new ID hierarchy by a catalogue system, explained in detail with regard to FIG. 7.

Optionally, the platform provider can send a Quote Status Report message 604 to acknowledge acceptance of the quote and an Execution Report<8> message with the OrdStatus<39> field set to 'New' to acknowledge that quote has been converted to an active order with no matching orders available. Market Data Snapshot or Full Refresh messages are sent by the platform provider to all market participants to inform them about available quotes and orders. Optional messages are recorded in blocks and could be searched and retrieved later. They do not add new information to the ID hierarchy built by the catalogue system because they don't introduce new IDs or new relationships between the IDs.

As soon as a matching order becomes available, an Execution Report <8> message 606 will be sent with OrdStatus <39> field set to 'Partially Filled' in case when the full quote amount could not be matched. It will be followed by one or more Execution Report <8> messages until the full amount of the quote is matched. The last Execution Report <8> message will have OrdStatus <39> set to 'Filled.'

Alternatively, the quote can be canceled using Quote Cancel <Z> message with the same QuoteID <117> value as used in Quote <S> message, which started this transaction. Quotes can be canceled before they are filled or when they are partially filled. Cancelation of the quote will be acknowledged by the platform provider using Quote Status Report <AI> message. If cancelation is successful, QuoteStatus <297> field in Quote Status Report <AI> message will contain one of these values: 1, 2, 3, 4, 14 or 15. Where 1—canceled for symbol(s), 2—canceled for security type(s), 3—canceled for underlying and 4—canceled all, 14—canceled due to lock market and 15—canceled due to cross market. If cancelation is not successful, it will not affect the end of transaction.

The end of transaction for a market maker is identified either by Execution Report <8> message with OrdStatus <39> set to 'Filled' or by Quote Status Report <AI> message with QuoteStatus <297> field set to 1, 2, 3, 4, 14 or 15 value (these values acknowledge successful cancelation of the quote) whichever arrives first.

Hierarchy of IDs that will be built and stored in the catalog is depicted below. QuoteID <117> field is the top ID associated with the start of a new transaction. The OrdID <39> field is the market maker order ID linked to the quote submitted by the market maker institution. This ID could be provided by the market maker or generated by the trading venue. In this example, there are two ClOrdId <11>, one for each match. There could be more than two matches. The matches could be made with different or the same counterparty and each counter-party will have its unique ClOrdId <11> for each match.

The catalogue will append to the ID hierarchy for as long as the transaction is open and the new IDs linked to the IDs listed in the hierarchy appear in messages. When the end of transaction message arrives (in this case Execution Report <8> with OrdStatus <39> set to 'Filled') 608 or Quote Status Report <AI> message with QuoteStatus <297> fields set to 1, 2, 3, 4, 14 or 15), the catalogue will close the transaction and stop appending to the hierarchy.

The ID hierarchy will be used by the catalogue system to search and retrieve messages associated with a specific transaction by searching for messages with IDs listed in the hierarchy.

Figure 6B:
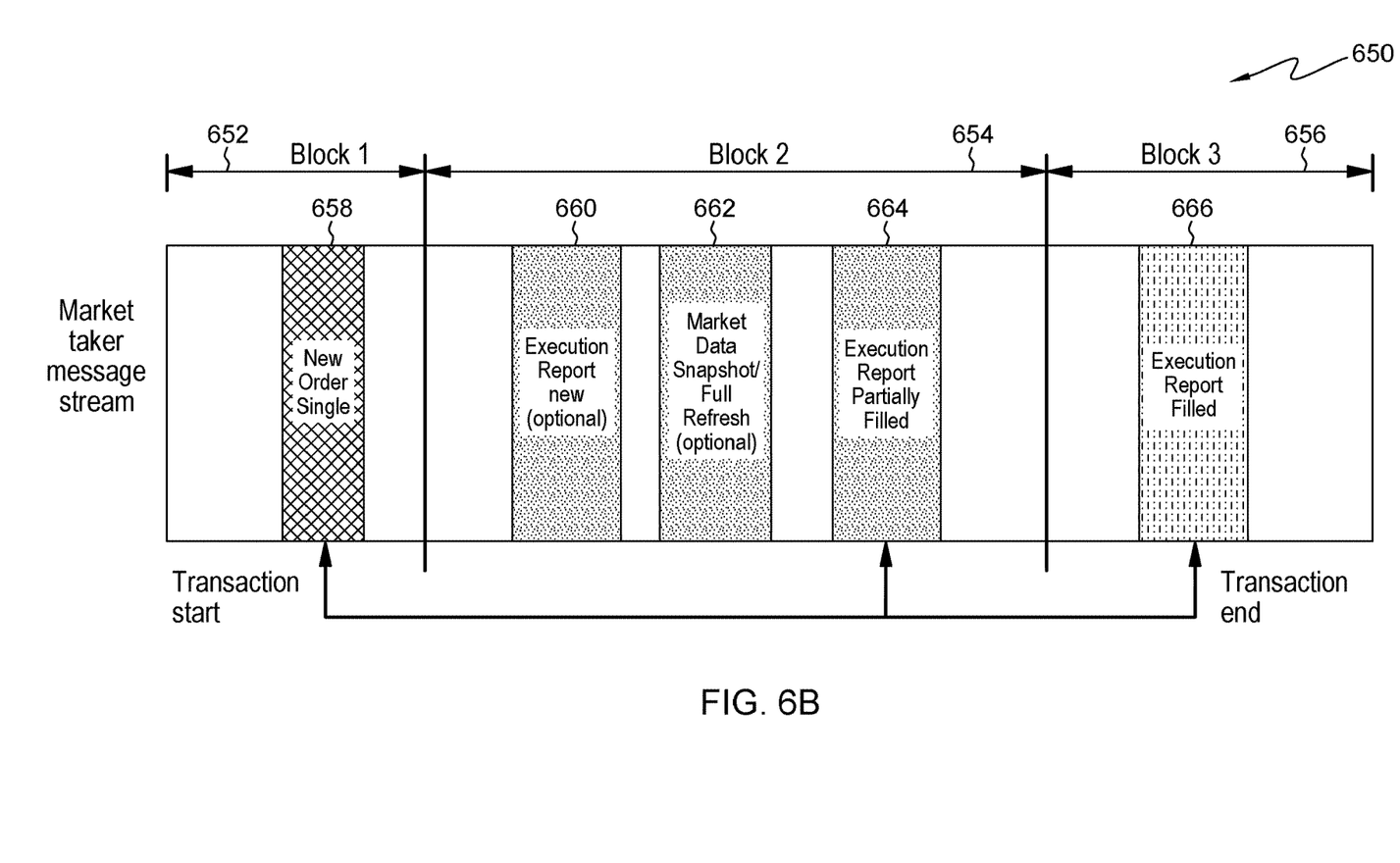
FIG. 6B is a flow diagram of a buy-side message stream for a transaction, in accordance with one or more aspects of the present disclosure.

FIG. 6B is a flow diagram of a buy-side message stream 650 for a transaction. The transaction spans data blocks 652, 654 and 656.

For market takers (buy-side institutions), the following definitions can be used:

1. Start of transaction—New Order Single <D> message.
2. End of transaction—Execution Report <8> message with order fill confirmation or Execution Report <8> message with order cancelation acknowledgement.

For market takers, the transaction will start with submission of New Order Single <D> message 658 to the platform provider with a new ID in the ClOrdID <11> field and will trigger creation of a new ID hierarchy by the catalogue.

Optionally, the platform provider could send the Execution Report message <8> 660 acknowledging the acceptance of new order with OrdStatus <39> field set to 'New.' The platform provider will also send Market Data Snapshot or Full Refresh messages (e.g., market data message 662) to inform market participant about new quotes and orders. Optional messages are recorded in blocks and could be searched and retrieved later. They do not add new information to the ID hierarchy built by the catalogue system because they don't introduce new IDs or new IDs or new relationships between the IDs.

In this example, a new order is matched with two orders in the market resulting in two Execution Report <8> messages with the OrdStatus <39> field set to 'Partially Filled' 664 and 'Filled' 666. Note that the new order could be canceled or matched with more than two orders.

A market maker can cancel its order by sending Order Cancel Request <F> message. Orders can be canceled if they are not filled or not completely filled. If order is filled or cannot be canceled due to other market rules, cancelation request will be rejected by the platform provider by sending Order Cancel Reject <9> message—this is acknowledgment of unsuccessful cancelation. If cancelation is not successful, it will not affect the end of transaction. A cancelation request Order Cancel Request <F> comes with a new ClOrdID <11> value, which is linked to the original ClOrdID <11> via OrigClOrdld <41> field.

The catalogue will build the following hierarchy based on this example. In this example, the second Execution Report message with Order Status field set to 'Filled' will close this transaction.

The end of transaction for market takers will be identified by Execution Report <8> message which confirms that order is filled—OrdStatus <39> field is set to 'Filled' or by Execution Report <8> message which acknowledges successful cancelation of the order—ExecType <150> field set to 'Canceled.'

In one embodiment, a system can record the streams of data leaving and entering a financial institution, in accordance with one or more aspects of the present disclosure. Each stream of data is defined by, for example, the financial institution that sends and receives data; the platform provider processing the data; the protocol used for data exchange; and the product or instrument transacted.

To increase granularity, in one embodiment, sub-streams can be created for a large stream of data, based on additional parameters such as, for example, legal entity, the counterparty, the trading desk, the customer account, etc. Financial institutions frequently have multiple legal entities related to each other. When they trade, the trades are executed on behalf of a specific legal entity.

Each stream of data, which may include data for one or more transaction, is recorded for a limited period of time, collecting a sufficient amount of data to create a block of transactions. The main factor in determining a closing for a data block is the volume of transactions created by a given financial institution. In one example, given a known volume of transactions, block closing can be time-based. This period of time for block creation should be configurable and can range from minutes to hours depending on the volume of transactions, product information recorded, tolerance to potential failure and data loss, and desired granularity for search functions. Once a sufficient amount of data is collected, a header for the data block will be created to record stream identification information, such as, for example, the financial institution for which the data is recorded, the platform provider that is processing the data, the protocol used for data exchange, the product/instrument and the date and time. In one embodiment, additional information can be included in the header to record, for example, a location where the message stream was recorded and, as another example, information for sub-streams.

FIG. 7 is a combination block/flow diagram 700 of one example of operation of a data block catalogue 702, in accordance with one or more aspects of the present disclosure. The catalogue provides prompt access to information about transaction communications of a financial institution for regulators and third parties, which is required in the United States. The catalogue will also support assignment of retention periods on a per-transaction basis. The retention period assigned for a given EFT is based, at least in part, on the financial instrument involved. Append-only storage 318 from FIG. 3 is shown here as two stores 318A and 318B, but it could just be the one or more than two such stores. Blocks and headers (704 and 706), along with headers only 708 from blockchain system 322, are provided to the catalogue. In response, block IDs and locations (710 and 712) are sent to the append-only stores from the catalogue, while header IDs 714 and sent to the blockchain system from the catalogue. A query engine 714 (e.g., for regulators) can send a search/retrieve request 716 to the catalogue and receive results with validated blocks and headers (collectively, 718).

The disclosed catalogue system provides prompt access to the information about records retained by searching, for example, via transaction ID and navigating the transaction ID hierarchy to find blocks containing all messages related to a specific transaction. In addition, the catalogue system manages data retention on a per-transaction basis and reduces data over-retention.

With regard to needing to retrieve data in the stored data blocks, financial institutions or their regulators/auditors can request the data from, for example, cloud storage by specifying selection criteria. However, predefining selection criteria is not practically possible, because data queries continue to get more precise and sophisticated, and financial institutions are expected to provide data that matches these criteria exactly. However, all selections are time-based, i.e., the data for a specific timeframe is requested.

The catalogue system has a list of all messages associated with a specific transaction; therefore, in some embodiments, additional criteria can be layered on top of that.

In addition, the catalogue can use fields stored within messages associated with a specific transaction, to support search criteria. For example, the catalogue can extract all messages for transactions initiated within a specific timeframe based on transaction start messages and a timestamp within each of these transaction start messages. As another example, the catalogue disclosed herein can extract all messages for transactions initiated against a specific financial product/instrument by checking an instrument field in each start message and selecting all other messages associated with the start message that includes the specific product/instrument code. A similar approach can be used for searching transactions associated with, for example, a specific customer; a specific country; a specific trading floor/trader; a specific price range; and a rejection message sent by a provider.

To accommodate all possible search criteria, financial institutions are required to provide reference data in addition to the data streams recorded. In one example, the reference data may be a dictionary which translates symbols (such as counter-party id) used in trading messages to their full description (such as company and trading floor name). Alternatively, financial institutions can perform translations of search criteria to data fields available in the data stream. For example, a product ID could be provided instead of a product name to be searched, an account number instead of a customer name to be searched, etc.

Once the search criteria are specified, including the search timeframe, the system will collect all data blocks to be searched based on the information stored in the catalogue. The content of each block can be validated by calculating and comparing the error detection value of the content with the value stored in the header records kept in the blockchain. Blocks that fail the integrity check may need to be fetched from alternative copies, for example, from a backup copy or a disaster recovery copy.

The system will extract transactions associated with the search criteria from each block that contains relevant transactions and sequentially populate separate storage with these transactions. This storage could be provided to the requestor for them to review data and produce their own reports.

In addition to providing raw data to the requestor, a protocol-aware application could be used to consolidate messages into transactions using trade IDs. This approach will allow for life cycle of each trade to be recreated within the requested search timeframe.

Benefits of the above include, for example: that the catalogue supports flexible search criteria across message streams and blocks; and the catalogue system validates the integrity of data searched and delivered to the requestor.

The wealth of data collected by this system over a period time can be used to build predictive analytics tool to help financial institutions identify transactions, in real time, that could be of interest to regulators, i.e., as they arrive into the append-only storage.

To train a machine learning algorithm to identify transaction(s) of interest to regulators, the data collected by the system is, for example, split into training and testing data sets. In one embodiment, the training data set, all transactions that were previously provided to regulators, except for those used in the test data set(s) as described below, will be indicated as 'good' examples of transactions, while all other transactions will be indicated as 'bad' examples. A relatively small number of 'good' examples can be expected relative to 'bad' examples, thus, unsupervised machine learning methods may be desirable.

Once the data set is large enough to train a machine learning algorithm, a test set may be used to check the algorithm's ability to correctly identify the transactions of interest. The test set is a real set of transactions provided to regulators but not included in the training data set. The training process needs to be repeated with fresh data until the algorithm's quality is acceptable, i.e., when it produces a relatively small number (can be chosen by financial institution) of false positives.

The trained algorithm may then process data blocks as they are written to the append-only storage. Thus, the algorithm will be able to detect a set of transactions that could be of interest to regulators, based on the training done on previous data sets.

In a first aspect, disclosed above is a computer-implemented method. The method includes: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

In one example, the computer-implemented method may further include, for example, receiving, by the data processing system, a query from a user against the stored communications; processing, by the data processing system, the query; and providing, by the data processing system, resulting communications on the per-transaction basis from the stored communications to the user.

In one example, each of the stored communications in the computer-implemented method of the first aspect may have, for example, a protocol type from a group of protocol types, the computer-implemented method further including preprocessing, by the data processing system, each of the stored communications, based on the protocol type thereof.

In one example, the storing in the computer-implemented method of the first aspect may include, for example, applying, by the data processing system, blockchain technology to the collected communications. In one example, the applying may include, for example, building, by the data processing system, a data block, the data block including at least one of the stored communications, a header and an error detection value.

In one example, the storing in the computer-implemented method of the first aspect may include, for example, building, by the data processing system, a data block, the data block including at least one of the stored communications, a header and an error detection value, and storing the data block in an append-only database. In one example, the storing may include, for example, applying, by the data processing system, blockchain technology to the collected communications. In one example, the applying may include, for example, storing, by the data processing system, a copy of the header and error detection value in a blockchain system.

In one example, the computer-implemented method of the first aspect may include, for example, predicting, by the data processing system, EFT(s) of potential interest to a subsequent query. In one example, the predicting may include, for example, executing, by the data processing system, queries against the append-only store; storing, by the data processing system, each query and corresponding result in a data set; and using, by the data processing system, machine learning on the data set.

In one example, the EFT in the computer-implemented method of the first aspect may involve, for example, a financial product, the computer-implemented method may further include, for example, assigning, by the data processing system, a retention period to each of the collected communications based on the financial product. In one example, the computer-implemented method may further include, for example, deleting, by the data processing system, each of the collected communications after an end of the retention period.

In a second aspect, disclosed above is a system. The system includes a memory, and processor(s) in communication with the memory, the memory storing program code executable by the processor(s) to perform a method. The method includes: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

In one example, the method in the system of the second aspect may further include, for example, receiving, by the data processing system, a query from a user against the stored communications; processing, by the data processing system, the query; and providing, by the data processing system, resulting communications on the per-transaction basis from the stored communications to the user.

In one example, each of the stored communications in the system of the second aspect may have, for example, a protocol type of protocol types, the method may further include, for example, preprocessing, by the data processing system, each of the stored communications, based on the protocol type thereof.

In one example, the storing in the method of the system of the second aspect may include, for example, building, by the data processing system, a data block, the data block including at least one of the stored communications, a header and an error detection value and storing, by the data processing system, the data block in an append-only database. The method may further include, for example, storing, by the data processing system, a copy of the header and the error detection value in a blockchain system.

In one example, the method of the system of the second aspect may further include, for example, predicting, by the data processing system, EFT(s) of potential interest to a subsequent query.

In one example, the EFT in the system of the second aspect may, for example, involve a financial product, the method may further include, for example, assigning, by the data processing system, a retention period to each of the collected communications based on the financial product.

In a third aspect, disclosed above is a computer program product. The computer program product includes: a storage medium readable by a processor and storing instructions executable by the processor for performing a method, the method includes: identifying, by a data processing system associated with a financial institution that is a party to an electronic financial transaction (EFT), an end of the EFT; based on the identifying, collecting, by the data processing system, all communications into and out of the financial institution relating to the EFT required to be accessible for a retention period for regulatory compliance, resulting in collected communications; storing, by the data processing system, the collected communications such that the collected communications are immutable during the retention period, resulting in stored communications; and making, by the data processing system, the stored communications available for queries during the retention period on a per-transaction basis.

In one example, the method in the computer program product of the third aspect may further include, for example, receiving, by the data processing system, a query from a user against the stored communications; processing, by the data processing system, the query; and providing, by the data processing system, resulting communications on the per-transaction basis from the stored communications to the user.

In one example, each of the stored communications in the computer program product of the third aspect may have, for example, a protocol type from a group of protocol types, the method may further include, for example, preprocessing, by the data processing system, each of the stored communications, based on the protocol type thereof.

In one example, the storing in the method of the computer program product of the third aspect may include, for example, building, by the data processing system, a data block, the data block including at least one of the stored communications, a header and an error detection value and storing, by the data processing system, the data block in an append-only database. The method may further include, for example, storing, by the data processing system, a copy of the header and the error detection value in a blockchain system.

In one example, the method of the computer program product of the third aspect may further include, for example, predicting, by the data processing system, EFT(s) of potential interest to a subsequent query.

In one example, the EFT in the computer program product of the third aspect may involve, for example, a financial product, the method may further include, for example, assigning, by the data processing system, a retention period to each of the collected communications based on the financial product.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling network access that may be on-demand or otherwise, to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 8:
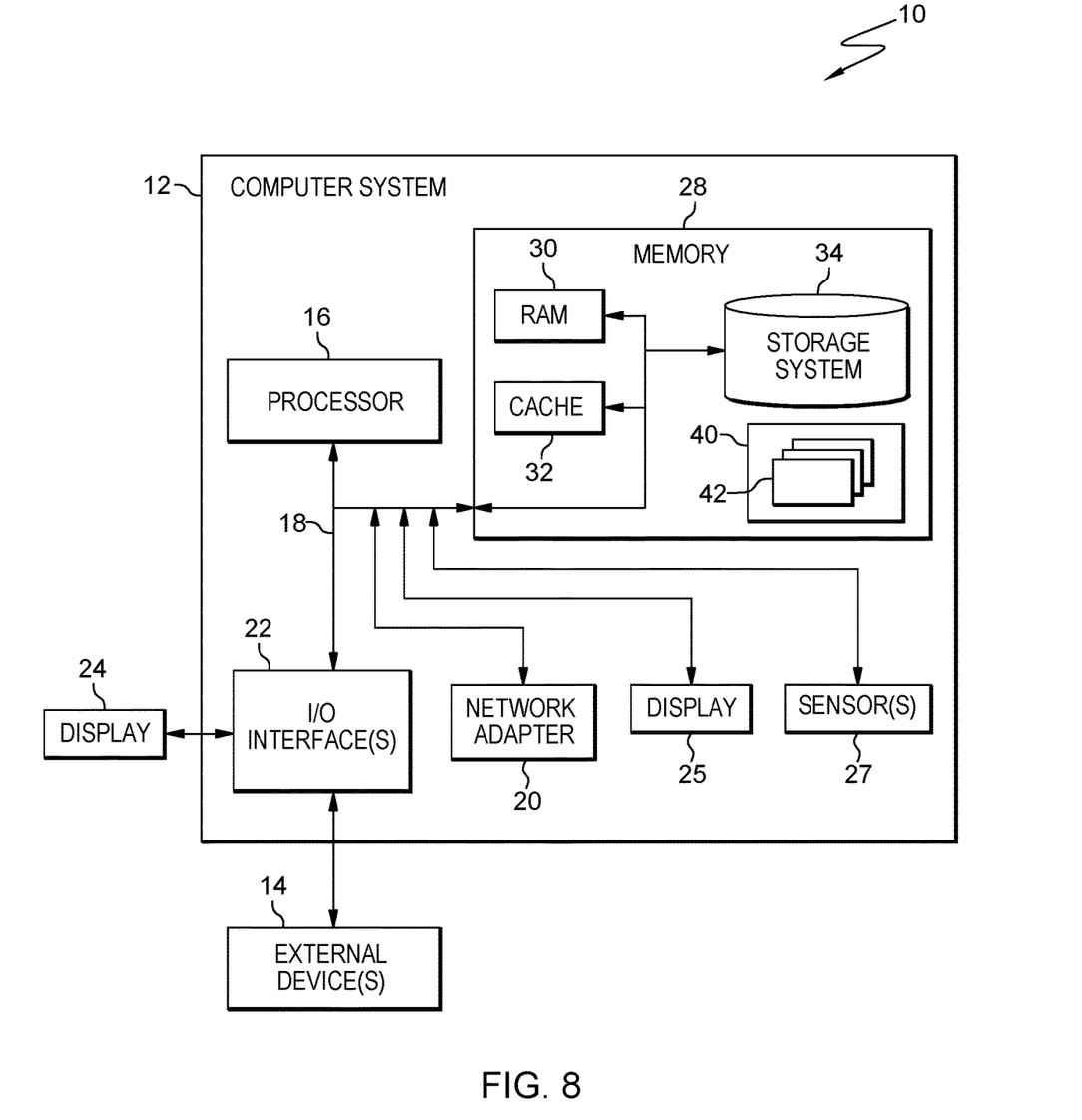
FIG. 8 is a block diagram of one example of a computer system, in accordance with one or more aspects of the present disclosure.

Referring now to FIG. 8, a schematic of one example of a computing node is shown. Computing node 10 is only one example of a computing node suitable for use with the present invention, including, for example, use as a cloud computing node, and is not intended to suggest any limitation as to the scope of use or functionality of embodiments of the invention described herein. Computing node 10 is capable of being implemented and/or performing any of the functionality set forth herein. Computing node 10 can be implemented as a cloud computing node in a cloud computing environment, or can be implemented as a computing node in a computing environment other than a cloud computing environment.

Computing node 10 includes a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable storage. Such storage may be any available storage that is accessible by computer system 12, and it includes both volatile and non-volatile storage, removable and non-removable storage.

System memory 28 can include computer system readable media in the form of volatile memory, such as random access memory (RAM) 30 and/or cache memory 32. Computer system 12 may further include other removable/non-removable, volatile/non-volatile computing system storage media. By way of example only, storage system 34 can be provided for reading from and writing to a removable or non-removable, non-volatile storage, for example, a flash memory drive or magnetic disk-based hard drive. Although not shown, an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, an audio sensor or input device, etc. Computer system 12 can include one or more network adapter 20.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method, comprising:
    identifying, by a data processing system associated with a financial institution that is a party to an electronic financial transaction (EFT), an end of the EFT;
    based on the identifying, collecting, by the data processing system, all communications into and out of the financial institution relating to the EFT required to be accessible for a retention period for regulatory compliance, resulting in collected communications;
    storing, by the data processing system, the collected communications such that the collected communications are immutable during the retention period, resulting in stored communications;
    receiving, by the data processing system, a query from a user against the stored communications;
    processing, by the data processing system, the query; and
    providing, by the data processing system, resulting communications on a per-transaction basis from the stored communications to the user.

2. The computer-implemented method of claim 1, wherein each of the stored communications has a protocol type of a plurality of protocol types, the computer-implemented method further comprising preprocessing, by the data processing system, each of the stored communications, based on the protocol type thereof.

3. The computer-implemented method of claim 1, wherein the storing comprises:
    building, by the data processing system, a data block, the data block comprising at least one of the stored communications, a header and an error detection value; and
    storing the data block in an append-only database.

4. The computer-implemented method of claim 3, wherein the storing comprises applying, by the data processing system, blockchain technology to the collected communications.

5. The computer-implemented method of claim 4, wherein the applying comprises storing, by the data processing system, a copy of the header and error detection value in a blockchain system.

6. The computer-implemented method of claim 5, further comprising:
    sending, by the data processing system, the data block to a catalogue data processing system;
    recording, by the data processing system, information in the header; and
    reading and recording, by the data processing system, at least some content of the data block.

7. The computer-implemented method of claim 1, further comprising predicting, by the data processing system, one or more EFT of potential interest to a subsequent query.

8. The computer-implemented method of claim 7, wherein the predicting comprises:
    executing, by the data processing system, a plurality of queries against the append-only store;
    storing, by the data processing system, each query and corresponding result in a data set; and using, by the data processing system, machine learning on the data set.

9. The computer-implemented method of claim 1, wherein the EFT involves a financial product, the computer-implemented method further comprising assigning, by the data processing system, a retention period to each of the collected communications based on the financial product.

10. The computer-implemented method of claim 9, further comprising deleting, by the data processing system, each of the collected communications after an end of the retention period.

11. A system, comprising:
    a memory; and
        at least one processor in communication with the memory, the memory storing program code executable by the at least one processor to perform a method, the method comprising:
        identifying, by a data processing system associated with a financial institution that is a party to an electronic financial transaction (EFT), an end of the EFT;
        based on the identifying, collecting, by the data processing system, all communications into and out of the financial institution relating to the EFT required to be accessible for a retention period for regulatory compliance, resulting in collected communications;
        storing, by the data processing system, the collected communications such that the collected communications are immutable during the retention period, resulting in stored communications;
        receiving, by the data processing system, a query from a user against the stored communications;
        processing, by the data processing system, the query; and
        providing, by the data processing system, resulting communications on a per-transaction basis from the stored communications to the user.

12. The system of claim 11, wherein each of the stored communications has a protocol type of a plurality of protocol types, the method further comprising preprocessing, by the data processing system, each of the stored communications, based on the protocol type thereof.

13. The system of claim 11, wherein the storing comprises building, by the data processing system, a data block, the data block comprising at least one of the stored communications, a header and an error detection value, and storing, by the data processing system, the data block in an append-only database, the method further comprising storing, by the data processing system, a copy of the header and error detection value in a blockchain system.

14. The system of claim 11, the method further comprising predicting, by the data processing system, one or more EFT of potential interest to a subsequent query.

15. The system of claim 11, wherein the EFT involves a financial product, the method further comprising assigning, by the data processing system, a retention period to each of the collected communications based on the financial product.

16. A computer program product, comprising:
a storage medium readable by a processor and storing instructions executable by the processor for performing a method, the method comprising:
identifying, by a data processing system associated with a financial institution that is a party to an electronic financial transaction (EFT), an end of the EFT;
based on the identifying, collecting, by the data processing system, all communications into and out of the financial institution relating to the EFT required to be accessible for a retention period for regulatory compliance, resulting in collected communications;
storing, by the data processing system, the collected communications such that the collected communications are immutable during the retention period, resulting in stored communications;
receiving, by the data processing system, a query from a user against the stored communications;
processing, by the data processing system, the query; and
providing, by the data processing system, resulting communications on a per-transaction basis from the stored communications to the user.

17. The computer program product of claim 16, wherein each of the stored communications has a protocol type of a plurality of protocol types, the method further comprising preprocessing, by the data processing system, each of the stored communications, based on the protocol type thereof.

18. The computer program product of claim 16, wherein the storing comprises building, by the data processing system, a data block, the data block comprising at least one of the stored communications, a header and an error detection value, and storing, by the data processing system, the data block in an append-only database, the method further comprising storing, by the data processing system, a copy of the header and error detection value in a blockchain system.

19. The computer program product of claim 16, the method further comprising predicting, by the data processing system, one or more EFT of potential interest to a subsequent query.

20. The computer program product of claim 16, wherein the EFT involves a financial product, the method further comprising assigning, by the data processing system, a retention period to each of the collected communications based on the financial product.

* * * * *